United States Patent
Coffell et al.

(10) Patent No.: US 7,733,860 B2
(45) Date of Patent: Jun. 8, 2010

(54) METHOD FOR ADVERTISING REACHABLE ADDRESS INFORMATION IN A NETWORK

(75) Inventors: John Coffell, Kanata (CA); Shawn McAllister, Manotick (CA); Carl Rajsic, Nepean (CA)

(73) Assignee: Alcatel-Lucent Canada Inc., Kanata, ON (CA)

( * ) Notice: Subject to any disclaimer, the term of this patent is extended or adjusted under 35 U.S.C. 154(b) by 1564 days.

(21) Appl. No.: 10/286,491

(22) Filed: Nov. 1, 2002

(65) Prior Publication Data

US 2004/0085961 A1 May 6, 2004

(51) Int. Cl.
H04L 12/28 (2006.01)
(52) U.S. Cl. .................................. 370/392; 370/408
(58) Field of Classification Search .............. 370/392, 370/393, 408, 252
See application file for complete search history.

(56) References Cited

U.S. PATENT DOCUMENTS

| | | | | |
|---|---|---|---|---|
| 5,999,517 | A * | 12/1999 | Koning et al. ............... 370/255 |
| 6,473,408 | B1 * | 10/2002 | Rochberger et al. ......... 370/255 |
| 6,690,653 | B1 * | 2/2004 | Anbiah et al. ............... 370/256 |
| 7,039,014 | B1 * | 5/2006 | Krishnamurthy et al. .... 370/244 |
| 7,065,085 | B2 * | 6/2006 | Shin et al. ................... 370/392 |
| 7,197,549 | B1 * | 3/2007 | Salama et al. ............... 709/223 |
| 2001/0040895 | A1 * | 11/2001 | Templin ....................... 370/466 |
| 2004/0136320 | A1 * | 7/2004 | Frelechoux et al. ......... 370/229 |

FOREIGN PATENT DOCUMENTS

WO WO 02/054687 A2 7/2002

* cited by examiner

*Primary Examiner*—Hong Cho
(74) *Attorney, Agent, or Firm*—R. D. Snyder & Associates, Inc.

(57) ABSTRACT

The present invention provides a method for permitting fully detailed advertising of reachability information for some addresses in a network while efficiently summarizing reachability information for other addresses. At least one embodiment is implemented as part of a process used by logical nodes for advertising reachability information for members of a group of nodes represented by the logical node. At least one embodiment provides an "exception" instruction that allows detailed reachable address information to be advertised for an address that would otherwise be included in summary address information. At least one embodiment allows detailed reachability information to be advertised for the particular address while still allowing summarization of reachable address information for addresses sharing a common prefix with the "exception" address. At least one embodiment thereby allows detailed information to be advertised where needed while allowing summary address information to be advertised where such detailed information is not needed.

24 Claims, 6 Drawing Sheets

METHOD FOR ADVERTISING REACHABLE ADDRESS INFORMATION IN A NETWORK

FIELD OF THE DISCLOSURE

The present invention relates to the field of data communications networks, and more particularly to a method for advertising reachable address information in a network.

BACKGROUND

Switching systems (also referred to as "switching networks") route data through and among data communications networks. Switching systems typically comprise a plurality of switches and clusters of switches ("nodes") that provide data communications paths among elements of data communications networks.

The "topology" of a switching network refers to the particular arrangement and interconnections (both physical and logical) of the nodes of a switching network. Knowledge of the topology of a switching network is used to compute communications paths through the network.

For switching systems that comprise a small number of individual switches, the topology is fairly straightforward and can be described by identifying the individual nodes in the system and the communications links between them. For larger and more complex networks, however, the amount of data needed to identify all links between all nodes of the network can be quite extensive.

A number of approaches have been proposed to reduce the amount of information needed to describe the topology of complex switching networks. One approach involves grouping physical nodes into groups ("peer groups") that are viewed as individual logical nodes ("logical group nodes") having characteristics that comprise an aggregation of the characteristics of the individual nodes within the group. Such logical group nodes may be further grouped with other physical and/or logical nodes to form successively higher level peer groups, creating a hierarchy of peer groups and logical group nodes.

The PNNI Protocol

One example of a network that allows physical nodes to be grouped into levels of logical groups of nodes is a "PNNI" network. PNNI, which stands for either "Private Network Node Interface" or "Private Network Network Interface," is a protocol developed by the ATM Forum. The PNNI protocol is used to distribute topology information between switches and clusters of switches within a private ATM switching network. Details of the PNNI protocol can be found in various publications issued by the ATM Forum, including "Private Network Network Interface Specification Version 1.1 (PNNI 1.1)," publication No. af-pnni-0055.002, available at the ATM Forum's website at www.atmforum.com.

A "PNNI network" is a network that utilizes the PNNI protocol. Some basic features of a PNNI network are described below. It should be noted, however, that these features are not exclusive to PNNI networks. The same or similar features may be utilized by networks using other and/or additional protocols as well.

Physical Nodes

Figure 1:
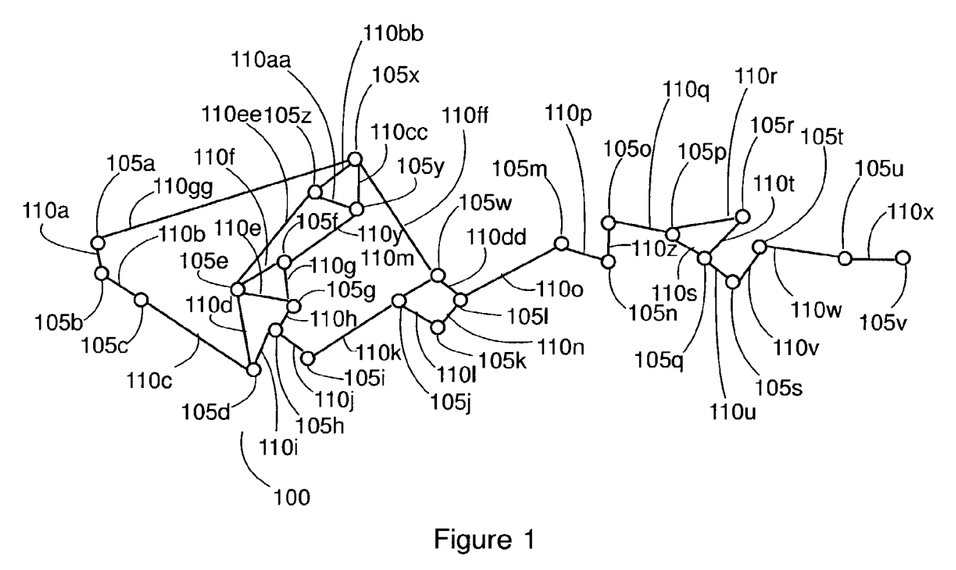
FIG. 1 is a schematic showing the physical layout of an example network.

FIG. 1 shows an example network 100 comprising twenty-six (26) physical nodes (also referred to as "lowest level nodes") 105*a-z*. Nodes 105*a-z* are interconnected by thirty three (33) bi-directional communications links 110*a-gg*.

Although network 100 is relatively small, identifying its topology is already fairly complex. One way that such identification may be accomplished is for each node to periodically broadcast a message identifying the sending node as well as the other nodes that are linked to that node. For example, in network 100 of FIG. 1, node 105*a* would broadcast a message announcing "I'm node 105*a* and I can reach nodes 105*b* and 105*x*." Similarly, node 105*x* would broadcast "I'm node 105*x* and I can reach nodes 105*a*, 105*w*, 105*y*, and 105*z*." Each of the other 24 nodes of network 100 would broadcast similar messages. Each node 105*a-z* would receive all the messages of all other nodes, store that information in memory, and use that information to make routing decisions when data is sent from that node to another.

Although each node broadcasting its individual connectivity information to all other nodes allows each node in a network to deduce the overall topology of the network, such massive broadcasting, particularly in large networks, consumes a significant amount of network bandwidth. Networks such as PNNI networks reduce this overhead by grouping nodes into a hierarchy of node groups called "peer groups."

Peer Groups and Logical Nodes

An important concept in PNNI and other networks is a "logical node". A logical node is viewed as a single node at its level in the hierarchy, although it may represent a single physical node (in the case of the lowest hierarchy level or a single member group) or a group of physical nodes (at higher hierarchy levels). For simplicity, logical nodes are sometimes referred to herein simply as "nodes." In a PNNI network, logical nodes are uniquely identified by "logical node IDs".

A peer group ("PG") is a collection of logical nodes, each of which exchanges information with other members of the group such that all members maintain an identical view of the group. Logical nodes are assigned to a particular peer group by being configured with the "peer group ID" for that peer group. Peer group IDs are specified at the time individual physical nodes are configured. Neighboring nodes exchange peer group IDs in "Hello packets". If they have the same peer group ID then they belong to the same peer group.

Figure 2:
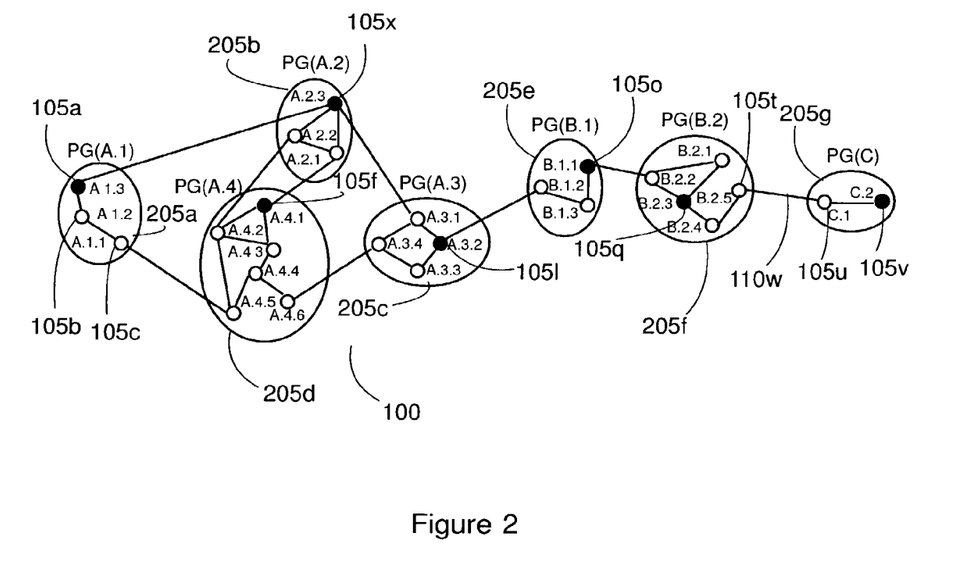
FIG. 2 is a schematic showing an example of how the nodes of the network of FIG. 1 may be arranged into peer groups.

Construction of a PNNI hierarchy begins by organizing the physical nodes (also referred to as "lowest level" nodes) of the network into a first level of peer groups. FIG. 2 shows network 100 of FIG. 1 organized into 7 peer groups 205*a-g*. In FIG. 2, peer group 205*a* is designated peer group "A.1." Similarly, peer groups 205*b-g* are designated peer groups "A.2," "A.3," "A.4," "B.1," "B.2," and "C," respectively. A peer group is sometimes referred to herein by the letters "PG" followed by a peer group number. For example, "PG(A.2)" refers to peer group A.2 205*b*. Node and peer group numbering, such as A.3.2 and A.3, is an abstract representation used to help describe the relation between nodes and peer groups. For example the designation of "A.3.2" for node 105*l* indicates that it is located in peer group A.3 205*c*.

Logical Links

Under the PNNI protocol, logical nodes are connected by "logical links". Between lowest level nodes, a logical link is either a physical link (such as links 110*a-gg* of FIG. 1) or a virtual private channel ("VPC") between two lowest-level nodes. Logical links inside a peer group are sometimes referred to as "horizontal links" while links that connect two peer groups are referred to as "outside links".

Information Exchange in PNNI

Each node in a PNNI network exchanges Hello packets with its immediate neighbors and thereby determines its local state information. This state information includes the identity and peer group membership of the node's immediate neighbors, and the status of its links to the neighbors. Each node bundles its state information in "PNNI Topology State Elements" (PTSEs), which are broadcast ("flooded") throughout the peer group. A node's topology database consists of a collection of all PTSEs received, which together represent that node's present view of the PNNI routing domain. The topology database provides the information needed to compute a route from the given node to any address reachable in or through the routing domain.

Nodal Information

Every node generates a PTSE that describes its own identity and capabilities, information used to elect the peer group leader, as well as information used in establishing the PNNI hierarchy. This is referred to as the nodal information. Nodal information includes topology state information and reachability information.

Topology state information includes "link state parameters", which describe the characteristics of logical links, and "nodal state parameters", which describe the characteristics of nodes. Reachability information consists of addresses and address prefixes that describe the destinations to which calls may be routed via a particular node.

Initial Topology Database Exchange

When neighboring nodes being initialized through the exchange of Hellos conclude that they are in the same peer group, they proceed to synchronize their "topology databases". Database synchronization is the exchange of information between neighbor nodes resulting in the two nodes having identical topology databases. The topology database includes detailed topology information about the peer group in which the logical node resides plus more abstract topology information representing the remainder of the PNNI routing domain.

Flooding

"Flooding" is the reliable hop-by-hop propagation of PTSEs throughout a peer group. Flooding ensures that each node in a peer group maintains an identical topology database. Flooding is an ongoing activity.

Peer Group Leader

A peer group is represented in the next higher hierarchical level as a single node called a "logical group node" or "LGN." The functions needed to perform the role of a logical group node are executed by a node of the peer group, called the "peer group leader." There is at most one active peer group leader (PGL) per peer group (more precisely at most one per partition in the case of a partitioned peer group). However, the function of peer group leader may be performed by different nodes at different times.

The particular node that functions as the peer group leader at any point in time is determined via a "peer group leader election" process. The criteria for election as peer group leader is a node's "leadership priority," a parameter that is assigned to each physical node at configuration time. The node with highest leadership priority in a peer group becomes leader of that peer group. The election process is a continuously running protocol. When a node becomes active with a leadership priority higher than that of the current PGL, the election process transfers peer group leadership to the newly activated node. When a PGL is removed or fails, the node with the next highest leadership priority becomes PGL.

In the network of FIG. 2, the current PGL's are indicated by solid circles. Thus node A.1.3 105a is the peer group leader of peer group A.1 205a, node A.2.3 105x is the PGL of PG A.2 205b, node A.4.1 105f is the PGL of PG A.4 205d, node A.3.2 105l is the PGL of PG A.3 205c, node B.1.1 105o is the PGL of PG B.1 205e, node B.2.3 105q is the PGL of PG B.2 205f, and node C.2 105v is the PGL of PG C 205g.

Next Higher Hierarchical Level

Figure 3:
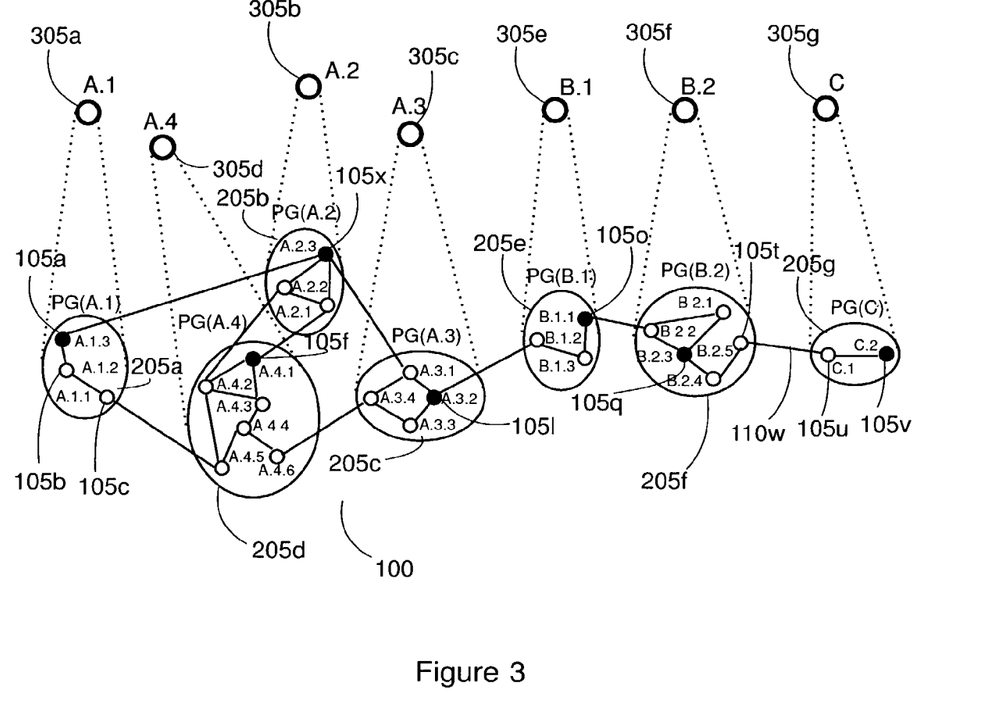
FIG. 3 is a schematic showing an example of a logical view of the peer group arrangement of FIG. 2.

The logical group node for a peer group represents that peer group as a single logical node in the next higher ("parent") hierarchy level. FIG. 3 shows how peer groups 205a-g are represented by their respective LGN's in the next higher hierarchy level. In FIG. 3, PG(A.1) 205a is represented by logical group node A.1 305a, PG(A.2) 205b is represented by logical group node A.2 305b, PG(A.3) 205c is represented by logical group node A.3 305c, PG(A.4) 205d is represented by logical group node A.4 305d, PG(B.1) 205e is represented by logical group node B.1 305e, PG(B.2) 205f is represented by logical group node B.2 305f and PG(C) 205g is represented by logical group node C 305g. Through the use of peer groups and logical group nodes, the 26 physical nodes 105a-z of FIG. 1 can be represented by the seven logical nodes 305a-g of FIG. 3.

Figure 4:
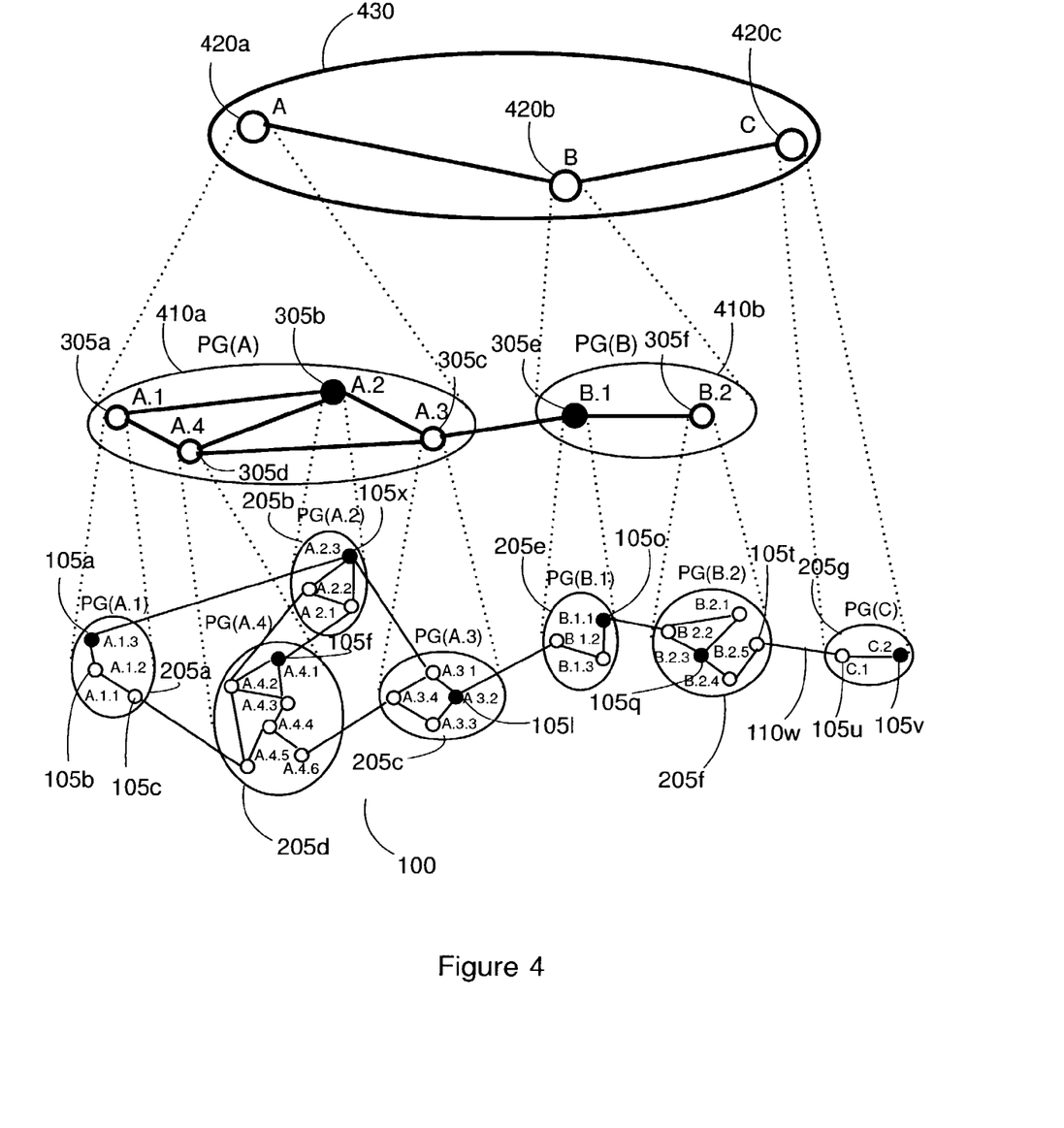
FIG. 4 is a schematic showing an example of how the peer groups of the network of FIG. 2 may be arranged into higher level peer groups.

Logical nodes 305a-g of FIG. 3 may themselves be further grouped into peer groups. FIG. 4 shows one way that peer groups 205a-f of FIG. 2, represented by logical group nodes 305a-f of FIG. 3, can be organized into a next level of peer group hierarchy. It should be noted that it is not necessary for all peer groups at a level to be represented by logical group nodes in the next higher level.

In FIG. 4, peer groups A.1 205a, A.2 205b, A.3 205c, and A.4 205d have been grouped into peer group A 410a, and peer groups B.1 205e and B.2 205f have been grouped into peer group B 410b. Peer group C 205g is not represented by a logical group node at this level. Peer group A 410a is called the "parent peer group" of peer groups A.1 205a, A.2 205b, A.3 205c and A.4 205d. Conversely, peer groups A.1 205a, A.2 205b, A.3 205c and A.4 205d are called "child peer groups" of peer group A 410a.

A parent peer group is identified by a peer group ID that is shorter in length than its child peer group IDs. Any node capable of becoming peer group leader should be configured with its parent peer group ID. The length of a peer group ID indicates the level of that peer group within the PNNI hierarchy.

Logical Group Node Functions

The functions of a logical group node are carried out by the peer group leader of the peer group represented by the logical group node. These functions include aggregating and summarizing information about its child peer group and flooding that information through its own peer group. A logical group node also passes information received from its peer group to the PGL of its child peer group for flooding. In addition, a logical group node may be a potential peer group leader of its own peer group. In that case, it should be configured so as to be able to function as a logical group node at one or more higher levels as well.

The manner in which a peer group is represented at higher hierarchy levels depends on the policies and algorithms of the peer group leader, which in turn are determined by the configuration of the physical node that functions as the peer group leader. To make sure that the peer group is represented in a consistent manner, all physical nodes that are potential peer group leaders should be consistently configured. However, some variation may occur if the physical nodes have different functional capabilities.

Peer groups function in the same manner at each hierarchy level. Thus higher level peer groups 410a-b of FIG. 4 are peer groups in the same manner as lower level peer groups 205a-g. The only difference is that each of its nodes represents a separate lower level peer group instead of a physical node.

Just like peer groups 205*a-g*, peer group A 410*a* has a peer group leader (logical group node A.2 305*b*) chosen by the same leader election process used to elect leaders of lower level peer groups 205*a-g*. It should be noted that for logical group node A.2 305*b* to be able to function as the peer group leader for PG A 410*a*, the functions that define peer group leader of A should be provided to logical node A.2 305*b*, which is in turn implemented on lowest-level physical node A.2.3 105*x* (which is the current peer group leader for peer group A.2 205*b*). Accordingly, physical node A.2.3 105*x* should be configured not just to function as peer group leader for peer group A.2 205*b*, but also as the peer group leader for peer group A 410*a*. The same is true for any other potential peer group leaders of peer group A.2 205*b*. Furthermore, if any other nodes of peer group A 410*a* are potential peer group leaders (which is the usual case), all physical nodes that are potential peer group leaders of their child peer groups should be configured to function as peer group leader for peer group A 410*a* as well.

Progressing To The Highest Level Peer Group

The PNNI hierarchy is incomplete until the entire network is encompassed in a single highest level peer group. In the example of FIG. 4 this is achieved by configuring one more peer group 430 containing logical group nodes A 420*a*, B 420*b* and C 420*c*, which represent peer groups A 410*a*, B 410*b*, and C 205*g*, respectively. Another possible configuration would be if peer groups B 420*b* and C 205*g* were aggregated into a peer group BC which was then aggregated with peer group A 420*a* to form the highest level peer group. The network designer controls the hierarchy via configuration parameters that define the logical nodes and peer groups.

The hierarchical structure of a PNNI network is very flexible. The upper limit on successive, child/parent related peer groups is given by the maximum number of ever shorter address prefixes that can be derived from longest 13 octet address prefix. This equates to 104, which is adequate for most networks, since even international networks can typically be more than adequately configured with less than 10 levels of ancestry.

Recursion in the Hierarchy

The creation of a PNNI routing hierarchy can be viewed as the recursive generation of peer groups, beginning with a network of lowest-level nodes and ending with a single top-level peer group encompassing the entire PNNI routing domain. The hierarchical structure is determined by the way in which peer group IDs are associated with logical group nodes via configuration of the physical nodes.

Generally, the behavior of a peer group is independent of its level. However, the highest level peer group differs in that it does not need a peer group leader since there is no parent peer group for which representation by a peer group leader would be needed.

Address Summarization & Reachability

Address summarization reduces the amount of addressing information that needs to be distributed in a PNNI network. Address summarization is achieved by using a single "reachable address prefix" to represent a collection of end system and/or node addresses that begin with the given prefix. Reachable address prefixes can be either summary addresses or foreign addresses.

A "summary address" associated with a node is an address prefix that is either explicitly configured at that node or that takes on some default value. A summary address may be classified into "internal" and "exterior" reachability classes. An "interior" summary address is a summary address that relates to reachable addresses within the network. An "exterior" summary address is a summary address that relates to reachable addresses outside of the network.

A "foreign address" associated with a node is an address which does not match any of the node's summary addresses. By contrast a "native address" is an address that matches one of the node's summary addresses.

Figure 5:
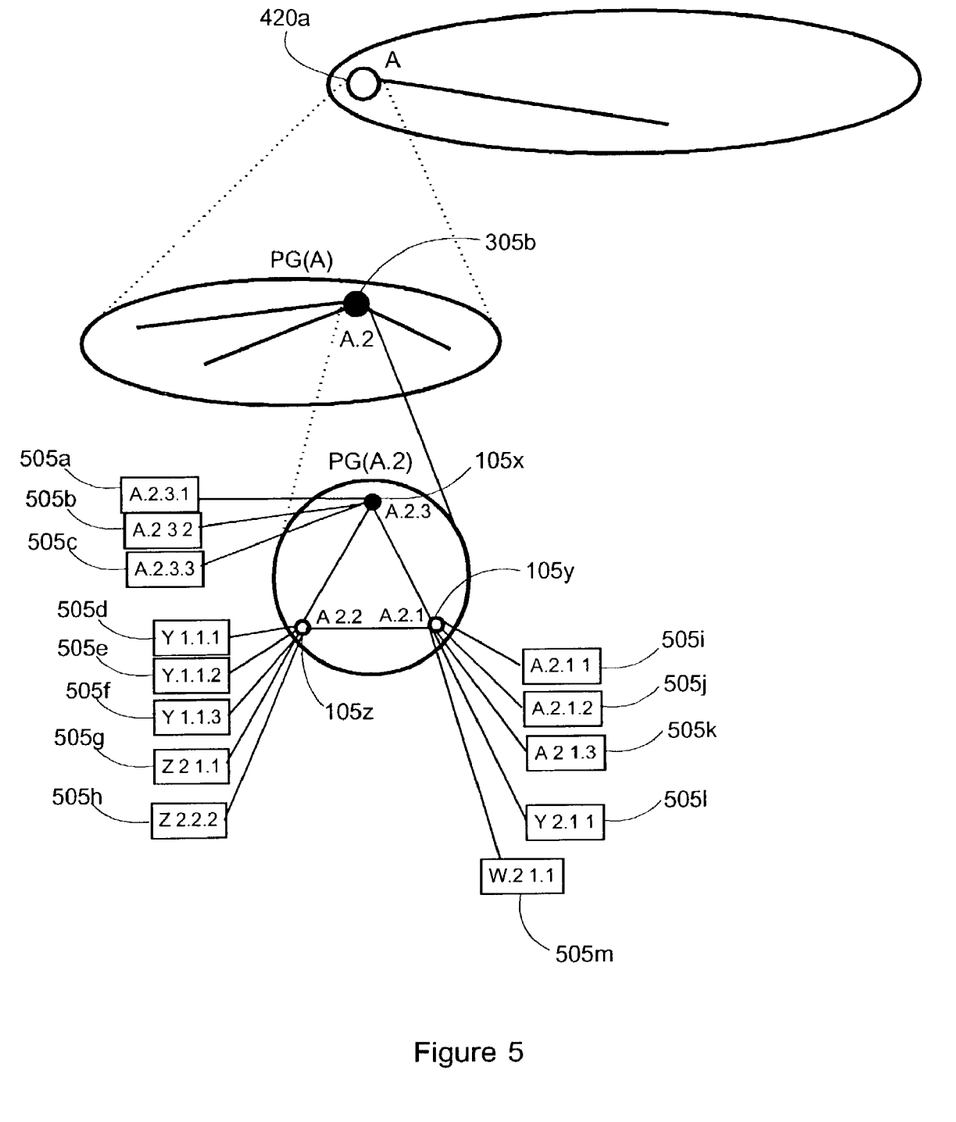
FIG. 5 is a schematic showing example reachable end system addresses for a portion of the network of FIG. 4.

These concepts are clarified in the example depicted in FIG. 5 which is derived from FIG. 4. The attachments 505*a-m* to nodes A.2.1, A.2.2 and A.2.3 represent end systems. The alphanumeric associated with each end system represents that end system's ATM address. For example <A.2.3.2> associated with end system 505*b* represents an ATM address, and P<A.2.3>, P<A.2>, and P<A> represent successively shorter prefixes of that same ATM address.

An example of summary address information that can be used for each node in peer group A.2 of FIG. 5 is shown in Table 1:

TABLE 1

Example Summary Address Lists for Nodes of PG(A.2)

| Summary Address List for A.2.1 | Summary Address List for A.2.2 | Summary Address List for A.2.3 |
|---|---|---|
| P<A.2.1> | P<A.2.2> | P<A.2.3> |
| P<Y.2> | P<Y.1> | |
| | P<Z.2> | |

The summary address information in Table 1 represents instructions setting forth how each node should advertise address information for other nodes reachable via that node. For example, the first column of Table 1 indicates that node A.2.1 should advertise any addresses beginning with the prefix "A.2.1 " as a single summarized address. The same is true for any addresses beginning with the prefix "Y.2".

Summary address listings are not prescribed by the PNNI protocol but are a matter of the network manager's choice. For example, the summary address P<Y. 1.1> could have been used instead of P<Y. 1> at node A.2.2 or P<W> could have been included at node A.2.1. But P<A.2> could not have been chosen (instead of P<A.2.1> or P<A.2.3>) as a summary address at nodes A.2.1 and A.2.3 because a remote node selecting a route would not be able to differentiate between the end systems attached to A.2.3 and the end systems attached to A.2.1 (both of which include end systems having the prefix A.2). For the chosen summary address list at A.2.1, P<W.2.1.1> is a foreign address since it does not match any of the summary addresses of node A.2.1.

Moving up the next level in the hierarchy, logical group node A.2 requires its own list of summary addresses. Here again there are different alternatives that can be chosen. Because PG(A.2) is the ID of peer group A.2 it is reasonable to include P<A.2> in the summary address list (in some embodiments the peer group ID of an LGN is included in the LGN's summary address list as a default). Further, because summary addresses P<Y.1> and P<Y.2> can be further summarized by P<Y>, it also makes sense to configure P<Y> as a summary address. The resulting summary address list for logical group node A.2 is shown in Table 2:

TABLE 2

Summary Address List for LGN A.2
Summary Address List
for LGN A.2

P<A.2>
P<Y>

Table 3 shows the reachable address prefixes advertised by each node in peer group A.2 according to their summary address lists of Table 1. A node advertises the summary addresses in its summary address list as well as foreign addresses (i.e. addresses not summarized in the summary address list) reachable through the node:

TABLE 3

Advertised Reachable Addresses of Nodes in Peer Group A.2

| Reachable Addresses flooded by node A.2.1 | Reachable Addresses flooded by node A.2.2 | Reachable Addresses flooded by node A.2.3 |
|---|---|---|
| P<A.2.1> | P<A.2.2> | P<A.2.3> |
| P<Y.2> | P<Y.1> | |
| P<W.2.1.1> | P<Z.2> | |

In the example of Table 3, node A.2.1 floods its summary addresses plus its foreign address whereas nodes A.2.2 and A.2.3 only issue their summary addresses since they lack any foreign addressed end systems.

Reachability information, i.e., reachable address prefixes (and foreign addresses), are fed throughout the PNNI routing hierarchy so that all nodes can reach the end systems with addresses summarized by these prefixes. A filtering is associated with this information flow that allows further summarization to increase scalability of the network. For example when LGN A.2 receives (via PGL A.2.3) the reachable address prefixes P<Y. 1> issued by node A.2.2 and P<Y.2> issued by node A.2.1 (see Table 3), it finds a match with its configured summary address P<Y>. LGN A.2 achieves a further summarization by advertising its single summary address P<Y> instead of separately advertising P<Y.1> and P<Y.2>.

Reachable address prefixes that cannot be further summarized by a LGN are advertised unmodified. For example when LGN A.2 receives the reachable address prefix P<Z.2> issued by A.2.2, the match against all its configured summary addresses (Table 2) fails, consequently LGN A.2 advertises P<Z.2> unmodified. Note that LGN A.2 views P<Z.2> as foreign since the match against all its configured summary addresses failed, even though P<Z.2> is a summary address from the perspective of node A.2.2. The resulting reachability information advertised by LGN A.2 is listed in Table 4:

TABLE 4

Advertised Reachable Addresses of Node A.2
Reachability information advertised by
LGN A.2.

P<A.2>
P<Y>
P<Z.2>
P<W.2.1.1>

It should be noted that the reachability information advertised by node A.2.3 shown in Table 3 is different from that advertised by LGN A.2 shown in Table 4, even though node A.2.3 is PGL of peer group A.2. The reachability information advertised by LGN A.2 is the only reachability information about peer group A.2 available outside of the peer group, regardless of the reachability information broadcast by the peer group members themselves.

The relationship between LGN A and peer group leader A.2 is similar to the relationship between LGN A.2 and peer group leader A.2.3. If LGN A is configured without summary addresses, then it would advertise all reachable address prefixes that are flooded across peer group A into the highest peer group (including the entire list in Table 4). On the other hand if LGN A is configured with the default summary address P<A> (default because the ID of peer group A is PG(A)) then it will attempt to further summarize every reachable address prefix beginning with P<A> before advertising it. For example it will advertise the summary address P<A> instead of the address prefix P<A.2> (see Table 4) flooded by LGN A.2.

The ATM addresses of the logical nodes are subject to the same summarization rules as end system addresses. The reachability information (reachable address prefixes) issued by a specific PNNI node is advertised across and up successive (parent) peer groups, then down and across successive (child) peer groups to eventually reach all PNNI nodes lying outside the specified node.

Suppressed Summary Addresses

There is another filter mechanism that can be used with advertising of reachability information to limit the distribution of reachable address prefixes. This mechanism involves associating a "suppressed summary address" with the address (es) of end system(s) that inhibits an LGN from advertising the suppressed summary address. This option allows some addresses in the lower level peer group to be hidden from higher levels of the hierarchy, and hence other peer groups. This feature can be implemented for security reasons, making the presence of a particular end system address unknown outside a certain peer group.

Address suppression is implemented by including a "suppressed summary address" in the summary address list of a LGN. For example, in FIG. 5, assume that for security purposes, a network manager wishes to prevent the reachability of node A.2.1.2 505j from being advertised by LGN A.2.1 105y, yet still wants to advertise the reachability of nodes A.2.1.1 and A.2.1.3.

As shown in Table 1, the summary address list for LGN A.2.1 105y prior to suppression includes the default prefix P<A.2.1>. This means that as long as there are nodes in LGN A.2.1's child peer group whose prefixes match P<A.2.1>, LGN A.2.1 will advertise P<A.2.1> as a reachable address.

To suppress the reachability of node A.2.1.2, the network manager can add P<A.2.1> to the summary address list of LGN A.2.1 as a suppressed summary address, thereby causing LGN A.2.1 to not advertise reachability of any of its reachable nodes having the prefix P<A.2.1> (nodes A.2.1.1 505i, A.2.1.2 505j and A.2.1.3 505k). Note that adding P<A.2.1.2> as a suppressed summary address would not have been sufficient. The existence of nodes A.2.1.1 505i and A.2.1.3 505k would still cause LGN A.2.1 to advertise reachability of P<A.2.1>, because even with node A.2.1.2 suppressed, these remaining nodes would match LGN A.2.1's summary address P<A.2.1>, thereby causing the summary address P<A.2.1> to be advertised.

Although adding suppressed summary address P<A.2.1> to LGN A.2.1's summary address list achieves the goal of suppressing advertising the reachability of node A.2.1.2, it has the unintended effect of suppressing advertising the reachability of nodes A.2.1.1 and A.2.1.3 as well. To allow the reachability of nodes A.2.1.1 and A.2.1.3 to be advertised by LGN A.2.1, these addresses can be explicitly added to LGN A.2.1's summary address list. Table 5 shows the summary address list for LGN A.2.1 before and after adding suppression of the reachability of node A.2.1.2:

TABLE 5

Suppressing Reachability of Node A.2.1.2

| Summary address list for node A.2.1 w/o suppression of A.2.1.2 | Summary address list for node A.2.1 w/suppression of A.2.1.2 |
|---|---|
| P<A.2.1>Default<br>P<Y.2><br>P<W.2.1.1> | P<A.2.1>Suppressed<br>P<Y.2><br>P<W.2.1.1><br>P<A.2.1.1><br>P<A.2.1.3> |

An entry having the longest prefix match with one or more nodes in the child peer group takes precedence over entries having a shorter prefix match. Accordingly, each summary address in an LGN's summary address list must have a unique prefix. For example, a summary address list may not contain a summary address and a suppressed summary address with the same prefix. The only time the same prefix may be used in two entries in a summary address list is if the list uses the "internal" and "exterior" reachability classes. In that case, two summary addresses may have the same prefix, but only if one is designated to be an "internal" summary address and the other an "exterior" summary address. However, prefixes within each reachability class must still be unique.

In Table 5, the explicit entries for P<A.2.1.1> and P<A.2.1.3> have longer prefixes than suppressed summary address entry for P<A.2.1>. Accordingly, the explicit entries for P<A.2.1.1> and P<A.2.1.3> take precedence over suppressed summary address entry for P<A.2.1>. The resulting addresses advertised by LGN A.2.1 are shown in Table 6:

TABLE 6

Advertised Reachable Addresses of Node A.2.1 w/suppression
Reachability information advertised by
LGN A.2.1

P<Y.2>
P<W.2.1.1>
P<A.2.1.1>
P<A.2.1.3>
Address Scoping

Reachability information advertised by a logical node always has a scope associated with it. The scope denotes a level in the PNNI routing hierarchy, and it is the highest level at which this address can be advertised or summarized. If an address has a scope indicating a level lower than the level of the node, the node will not advertise the address. If the scope indicates a level that is equal to or higher than the level of the node, the address will be advertised in the node's peer group.

When summarizing addresses, the address to be summarized with the highest scope will determine the scope of the summary address. The same rule applies to group addresses, i.e. if two or more nodes in a peer group advertise reachability to the same group address but with different scope, their parent node will advertise reachability to the group address with the highest scope.

It should be noted that rules related to address suppression take precedence over those for scope. That is, if the summary address list for an LGN contains an address suppression, that address is not advertised even if the scope associated with the address is higher than the level of the LGN.

Effect of Summarizing Reachability

Although using summary addresses reduces the amount of address information that needs to be propagated, it also reduces the amount of detail available for specific addresses. By aggregating parameters of the addresses that are summarized, details for specific addresses are hidden in the summarized address information.

At times, however, a network manager may wish to provide detailed reachability information for a particular node that has a prefix for which a summary address has been configured. For example, assume that node Y.1.1.3 505*f* of FIG. 5 has an external connection to a media gateway that warrants separate advertisement. Under the PNNI protocol, the addresses of reachable nodes in a peer group having a common prefix can be advertised in two ways: 1) by a summary address that aggregates reachabilitiy information for all nodes with the common prefix; or 2) by separate, explicit advertisement for each node with the common prefix. To separately advertise reachability information for node Y.1.1.3 505*f* of FIG. 5 the reachability information for the other nodes in the same peer group sharing the same prefix (namely nodes Y.1.1.1 505*d* and Y.1.1.2 505*e*) must be separately explicitly advertised as well. This leads to inefficient use of network bandwidth, because more detailed reachability information is broadcast than is actually needed.

SUMMARY OF THE INVENTION

The present invention comprises a method for permitting fully detailed advertising of reachability information for some addresses in a network while efficiently summarizing reachability information for other addresses. In one embodiment, the invention is implemented as part of a process used by logical nodes for advertising reachability information for members of a group of nodes represented by the logical node. The invention may be used with any network that involves the aggregation of nodes and nodal elements (such as reachability information) into logical nodes, including, without limitation, networks using the PNNI and IP protocols.

In one embodiment, the invention provides an "exception" instruction that allows detailed reachable address information to be advertised for an address that would otherwise be included in summary address information. The invention allows detailed reachability information to be advertised for the particular address while still allowing summarization of reachable address information for addresses sharing a common prefix with the "exception" address. The invention thereby allows detailed information to be advertised where needed while allowing summary address information to be advertised where such detailed information is not needed, thereby conserving network bandwidth.

DETAILED DESCRIPTION OF THE FIGURES

A method for summarizing reachable address information in a network is presented. In one or more embodiments, the invention is used by processes running in physical nodes of a network. The invention may be used in conjunction with a network management system, such as, for example, the Alcatel 5620 Network Management System. In one or more embodiments, the invention is implemented by means of software programming operating on switching systems, personal computers, computer workstations and or other computing platforms. In the following description, numerous specific details are set forth to provide a thorough description of the invention. However, it will be apparent to one skilled in the art that the invention may be practiced without these specific details. In other instances, well-known features have not been described in detail so as not to obscure the invention.

The invention may be used with networks in which the physical nodes of the network are represented by logical nodes representing groups of physical nodes arranged in a multi-level hierarchy. An example of such a network is shown in FIGS. 1-5. The example network of FIGS. 1-5 uses the PNNI protocol. However, the invention is equally applicable to networks using other protocols, including the IP protocol.

In some networks, network nodes are logically arranged into groups of nodes, also referred to as "peer groups," that are represented as a single logical node, referred to as a "logical group node," in the next higher level of the hierarchy. The function of a logical group node is at any one time performed by one of the member nodes of the peer group being represented by that logical group node. To perform the logical group node function, the physical node that acts as the logical group node is provided with computer program instructions that allow it to run the processes needed to function as a logical group node.

One of the functions of a logical group node ("LGN") is to advertise reachability information to members of the logical node's peer group. The reachability information advertised by a LGN indicates network addresses that are reachable via the LGN via the members of the LGN's child peer group. The reachability information may also include parameters for each of the advertised addresses, such as, for example, scope, bandwidth, and administrative weight.

One way in which an LGN can advertise reachability information is to receive reachability information from each member of its child peer group and simply advertise that same information to its own peer group. This type of advertising scheme provides detailed reachability information for each reachable address. However, it requires an excessive amount of bandwidth and fails to take advantage of address summarization efficiencies available.

Figure 6:
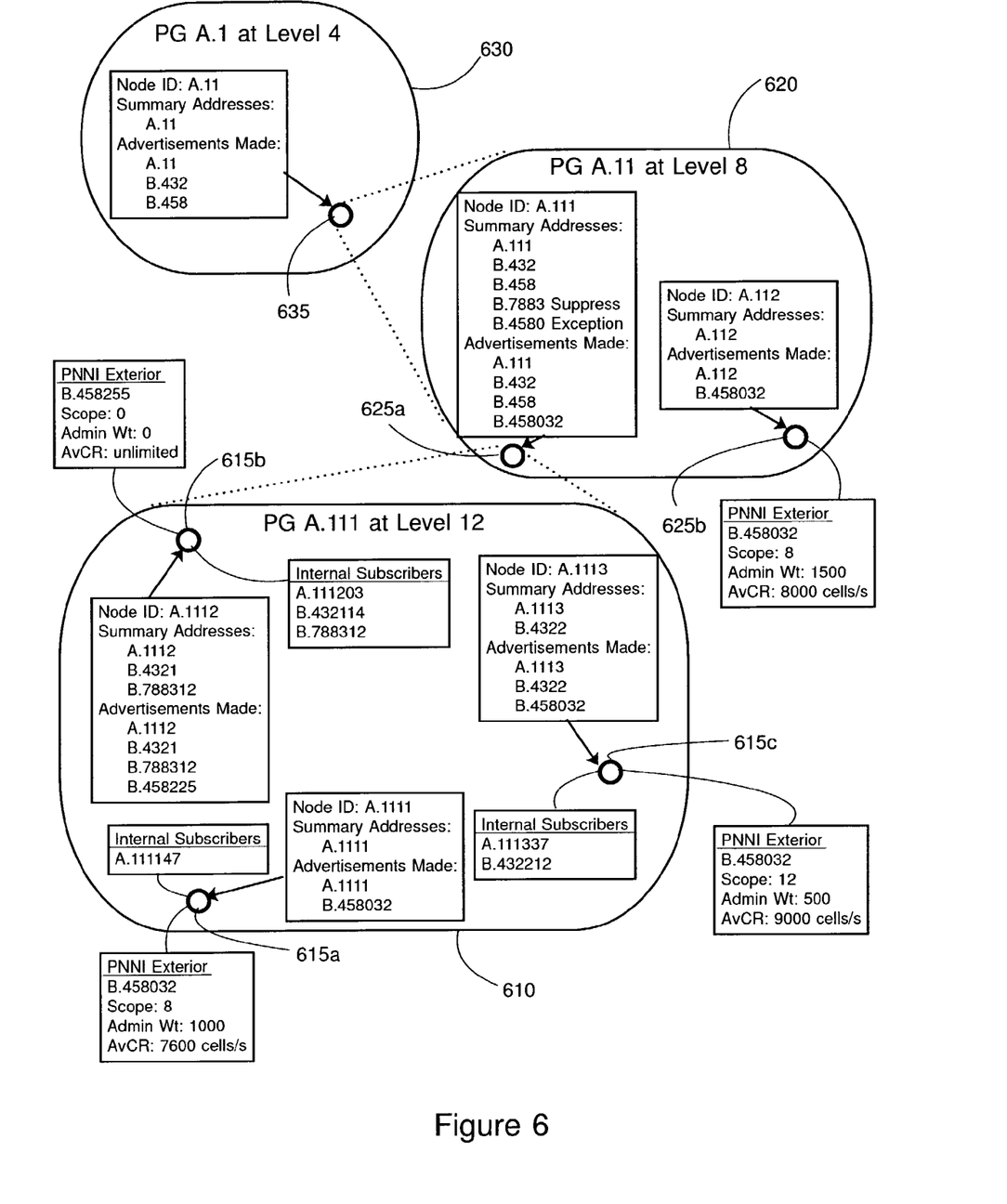
FIG. 6 is a schematic showing an example network comprising an embodiment of the invention.

FIG. 6 shows an example of a simple network that implements an embodiment of an address summarization process of the present invention. The example of FIG. 6 involves a network implemented according to the PNNI protocol. However, the invention may be used with networks using additional and/or other protocols, including the IP protocol.

FIG. 6 shows address summarization instructions and resultant advertisements made by members of three peer groups. These are peer groups ("PG's") A.111 610, A.11 620, and A.1 630, which have been configured to occupy levels 12, 8 and 4, respectively, of the network hierarchy shown in FIG. 6. In the PNNI protocol, the lower the level number the higher the hierarchical level. Accordingly, of the three peer groups of FIG. 6, peer group A.111 610 is the lowest level peer group and peer group A.1 630 is the highest level peer group. FIG. 6 shows the reachable address advertisements made by the member nodes of each of peer groups A.111 610, A.11 620, and A.1 630.

Referring first to PG A.111 610, this peer group comprises three nodes 615a, 615b and 615c. Each of nodes 615a-c has one or more "internal subscribers" and one or more "exterior" reachable addresses. An "internal subscriber" of a node is an address within the PNNI network that is reachable via that node. An "exterior" reachable address of a node is an address outside of the PNNI network that is reachable via that node. In the example of FIG. 6, each exterior reachable address has certain associated parameters, namely "scope", "administrative weight", and "available cell rate."

"Scope" is a parameter that specifies how far up the hierarchy the address should be advertised. For example, node 615c has an exterior reachable address B.458032 whose scope has been configured to be "12". The value of "12" indicates that the address can be advertised within peer groups whose level number is 12 or higher. "Administrative weight" is a parameter that assigns a relative administrative cost to reaching the advertised address via the node making the advertisement that may be used by a sending node to make routing decisions. "Available cell rate" is a measure of the bandwidth of the link to the advertised address, which also may be used to make routing decisions.

It should be noted that although in the embodiment of FIG. 6 associated parameters are shown only for the exterior reachable addresses, the same or other parameters may also be associated with internal reachable addresses. Furthermore, in other embodiments, the same or other parameters may be associated with both internal and exterior reachable addresses.

In addition to showing reachable internal and exterior addresses for each node, FIG. 6 also shows each node's node ID and summary address list, as well as the resulting advertisements. An example of a process used by a node to determine the advertisements to be made from the node's reachable addresses and summary address list is illustrated in FIG. 7.

Figure 7:
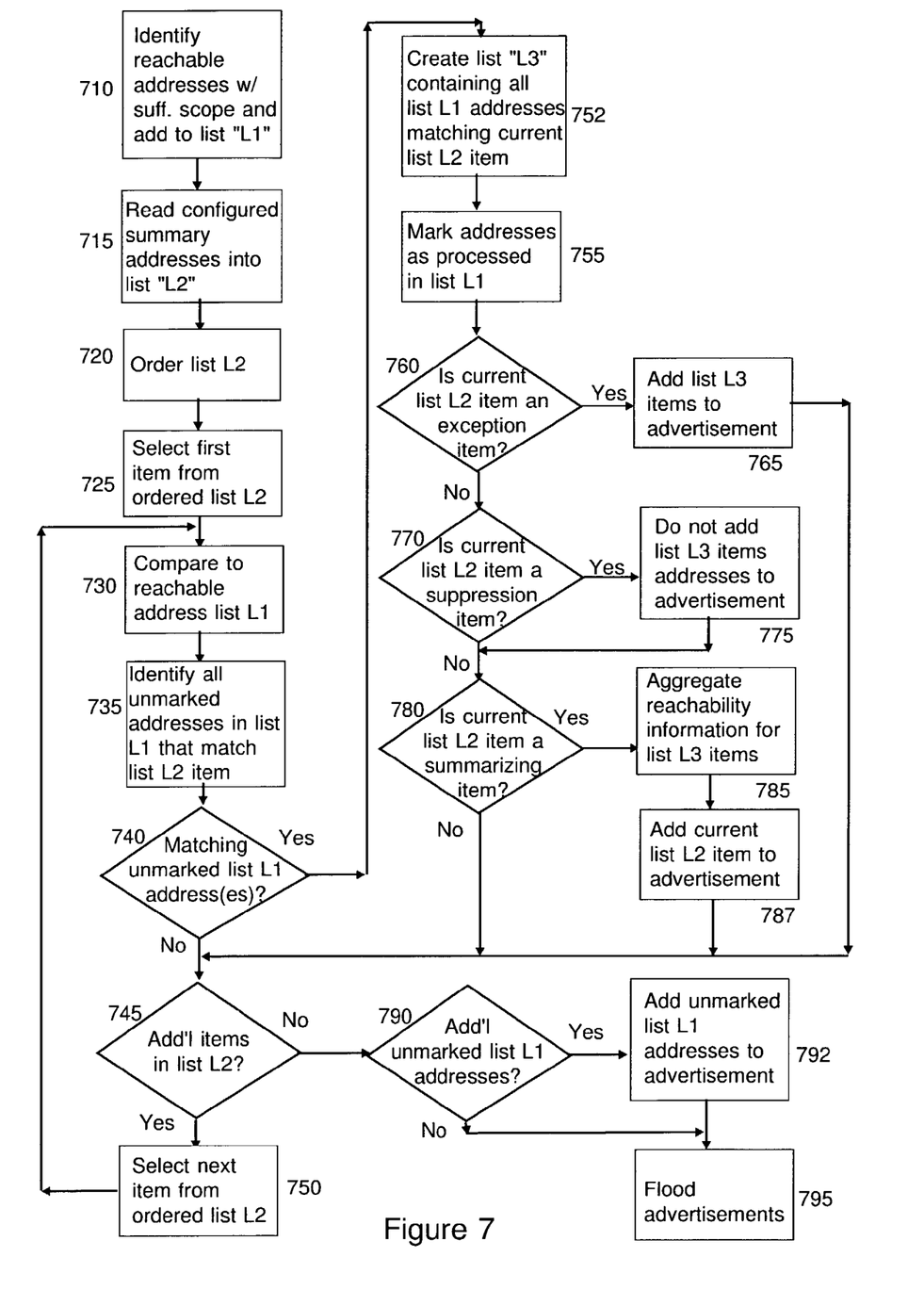
FIG. 7 is a flow chart showing a process used in an embodiment of the invention.

FIG. 7 shows a method used by a node (either a physical node or logical node, as appropriate) to determine which addresses it should broadcast within its peer group. It will be understood that the type and sequence of steps shown in FIG. 7 is exemplary only. In other embodiments, other steps applied in other sequences may be used to carry out the invention.

The process of FIG. 7 begins at step 710, at which the node identifies its reachable addresses (which may be addresses or address prefixes, as explained in greater detail below) having sufficient scope to be advertised at the level of the node's peer group (in one or more embodiments, an address that has no scope parameter associated with it is deemed to have no scope restrictions). In one or more embodiments, the node may compile a list of the identified reachable addresses. In the embodiment of FIG. 7, that list is referred to as list "L1."

At step 715, the node reads its configured summary addresses into a list. In the embodiment of FIG. 7, that list is referred to as list "L2.". At step 720, the node orders the items in summary address list L2 according to a priority. In one or more embodiments, the items are ordered according to priority of address prefix length, from longest to shortest, internal or external.

At step 725, the first item is selected from the ordered summary address list L2. At step 730, the selected summary address list item is compared to the reachable addresses in reachable address list L1, and all unmarked matching addresses in list L1 that match the selected summary address item are identified at step 735. A "matching" address is one that matches the reachability class (internal or exterior) and the prefix or address specified in the summary address list item. An "unmarked" address in list L1 is an item that has not yet been marked as matching a summary address list L2 item as described with respect to step 755 below.

At step 740, a determination is made as to whether any matching address(es) in list L1 were identified at step 735. If no matching address(es) were found at step 740, the process proceeds to step 745, where a determination is made as to whether any additional (unprocessed) items remain in the ordered summary address list L2 created at step 715. If additional items do remain, the next item from list L2 is selected at step 750 and the process returns to step 730.

If any matching address(es) are found at step 740, a list (designated list "L3 "in FIG. 7) containing those matching address(es) is created at step 752. Those address(es) are marked in list L1 as processed at step 755. "Marked as processed" means that they are flagged or identified in some other manner to indicate that they have been matched with an item in summary address list L2 and need not be considered with respect to any remaining items in summary address list L2.

At step 760 a determination is made as to whether the type of summary list L2 item currently being processed is an "exception" item. An "exception" item indicates that addresses matching the specified prefix are to be advertised, regardless of whether those addresses also match any other summary address list L2 items specifying a shorter length prefix. Because the process of FIG. 7 operates on summary address list items with the longest prefixes first, and matching addresses are removed from consideration with respect to subsequent items, at this point in the process there remain no unprocessed summary address list L2 items with longer prefixes than the item currently being processed. A match with an exception address thus means that the matching address will be advertised. Accordingly, all addresses added to list L3 in step 752 are added to a list of advertisements to be made by the node at step 765.

If it is determined at step 760 that the item being processed is not an exception item, the process proceeds to step 770, where a determination is made as to whether the current item is a "suppression" item. Addresses matching a "suppression" summary address list item are not advertised, even if they also match a "summarize" summary address list item having a shorter length prefix than that specified for the "suppression" item.

If it is determined at step 770 that the currently processed summary address list L2 item is a "suppression" item, then the matching addresses in list L3 are not added to the address list of advertisements to be made by the node.

If it is determined at step 770 that the currently processed list L2 item is not a suppression item, the process proceeds to step 780, where a determination is made as to whether the currently processed summary address list L2 item is a "summarizing" item. If it is determined that the current item is a summarizing item, then reachability information for all addresses in list L3 matching the specified summary address prefix is aggregated in a manner determined by the network operator at step 785 to produce aggregate reachability information for those matching addresses, and then the summary address prefix together with the aggregated reachability information are added to the list of addresses to be advertised at step 787. It should be noted that in embodiments where all summary address list items other than exception or suppression items are summarize items, step 780 is not necessary, and processing may proceed directly to step 785.

From step 787, the process returns to step 745, where a determination is made as to whether any additional unprocessed items remain in the ordered summary address list L2. If further unprocessed items remain, the next unprocessed summary address list L2 item is selected at step 750, and the process returns to step 730.

If there are no further unprocessed items in list L2, a determination is made at step 790 as to whether any reachable addresses remain in list L1 that have not been marked as processed at step 755. If there are no such remaining addresses, the list of addresses to be advertised identified at steps 765 and/or 787, together with any associated parameters, are flooded within the node's peer group at step 795. If there are remaining unmarked reachable addresses in list L1, those addresses are added to the list of addresses to be advertised at step 792, and those addresses, together with addresses identified at steps 765 and/or 787 are flooded at step 795.

The process of FIG. 7 may be used by the nodes of FIG. 6 to determine the advertisements to be made by each node.

Turning first to node 615*a*, node 615*a* has two reachable addresses: exterior address B.458032 and internal address A.111147 (the alphanumeric addresses used in FIG. 6 are simplified representations of what are typically ATM addresses). Exterior reachable address B.458032 has a scope of 8, which is less than the level number of node 615*a*'s peer group, which is at level 12. Accordingly, exterior address B.458032 has sufficient scope to be advertised by node 615*a* (in the embodiment of FIG. 6, all internal reachable addresses are deemed to have unlimited scope unless a lesser scope is specified).

The summary address list for node 615*a* contains a single item, namely summary address A.1111. Comparing summary address A.1111 to node 615*a*'s two reachable addresses (A.111147 and B.458032) yields a match with address A.111147. Accordingly, prefix A. 1111 (together with any associated reachability information, e.g. scope or administrative weight) is added to the list of addresses to be advertised by node 615*a*.

There are no further items in the summary address list for node 615*a*. However, there is an additional reachable address that has not been matched with any item in the summary address list: namely exterior address B.458032. Accordingly, address B.458032 is added to the addresses to be advertised by node 615*a*. The resulting advertisements made by node 615*a* are accordingly A.1111 and B.458032.

Turning next to node 615*b*, this node has four reachable addresses: three internal addresses A.111203, B.432114 andB.788312, and one exterior addressB.458255. The scope of exterior address B.458255 is "0", meaning it may be advertised at all levels.

The items in node 615*b*'s configured summary address list are A.1112, B.4321 and B.788312.

The item with the longest prefix is B.788312. Comparing this item with the four reachable addresses for node 615*b* yields a match with reachable address B.788312. Address B.788312 is thus added to the list of addresses to be advertised by node 615*b*. The next item in node 615*b*'s summary address list is B.4321. Comparing this item with the remaining three reachable addresses of node 615*b* yields a match with B.432114. Because there is only one matching address, there is no need to aggregate any reachable address information. The summary address prefix B.4321 is accordingly added to the list of addresses to be advertised together with the associated reachability information for address B.432114.

The remaining item on node 615b's summary address list is summary address A.1112. Comparing this item with the two remaining reachable addresses for node 615b yields a match with reachable address A.111203. Again, there is only one match, so no aggregation of associated reachability information need be made. The summary address prefix A.1112 is accordingly added to the list of addresses to be advertised together with the associated reachability information for address A.111203.

There are no further items in node 615b's summary address list. However, there is a remaining reachable address that has not matched any of the items in the summary address list, namely external reachable address B.458255. The scope of external reachable address B.458255 is 0 (unlimited), meaning it has sufficient scope to be advertised by node 615b. Accordingly, reachable address B.458255 together with its associated reachability information is added to the list of addresses to be advertised by node 615b. The resulting addresses advertised by node 615b are thus A.1112, B.4321, B.788312, and B.458225.

For node 615c, there are three reachable addresses A.111337, B.432212 and B.458032. External address B.458032 has a scope of 12, which matches the level of node 615c's peer group. Therefore external address B.458032 has sufficient scope to be advertised by node 615c.

Node 615c's summary address list contains two items: summary address A.1113 (which matches reachable address A.111337) and summary address B.4322 (which matches reachable address B.432212). Remaining external address B.458032 does not match any items in the summary address list. Accordingly, the addresses advertised by node 615c are A.1113, B.4322 and B.458032.

The advertisements made by nodes 615a-c within lowest level peer group 610 are listed in Table 7 below.

TABLE 7

Addresses Advertised in Peer Group 610 of FIG. 6

| Node 615a | Node 615b | Node 615c |
| --- | --- | --- |
| A.1111 | A.1112 | A.1113 |
| B.458032 (Scope 8) | B.4321 | B.4322 |
| | B.788312 | B.458032 (Scope12) |
| | B.458225 (Scope 0) | |

The addresses in Table 7 are the advertised reachable addresses for peer group 610. These addresses represent the reachable addresses to be considered for advertisement by LGN 625a, which represents peer group 610 in next level peer group 620 (it will be recalled that the function of LGN 625a will be carried out by whatever member of peer group 610 is at the time the peer group leader). Of those reachable addresses, the address B.458032 shows up twice: once from node 615a with a scope of 8 and once from node 615c with a scope of 12. Because peer group 620 is at level 8, only addresses with a scope of 8 or lower are advertisable. Accordingly, reachable address B.458032 from node 615c is not an advertisable reachable address for LGN 625a. The remaining advertisable reachable addresses for LGN 625a are:

A.1111
A.1112
A.1113
B.4321
B.4322
B.458032 (Scope 8)
B.458255 (Scope 0)
B.788312

These addresses are again processed according to the method of claim 7 to determine the reachable address advertisements made by LGN 625a according to the summary address list for LGN 625a, which contains the following items:

A.111
B.432
B.458
B.7883 Suppress
B.4580 Exception

The first item in LGN 625a's sorted summary address list is exception summary address B.4580. As explained above with respect to FIG. 7, any address whose longest prefix match is with an exception summary address of the present invention is advertised separately, together with its separate reachability information. Accordingly, the exception address of the invention allows a network manager to provide full reachability information with respect to an address that would otherwise be suppressed or summarized.

Comparing exception summary address B.4580 with the eight reachable addresses for LGN 625a yields a match with B.458032. Address B.458032 and its associated reachability information is accordingly added to the list of addresses to be advertised by LGN 625a.

The next item in LGN 625a's summary address list is suppressing summary address B.7883. Any addresses matching a suppress summary address are not advertised. Comparing suppress summary address B.7883 with the remaining seven reachable addresses for LGN 625a yields a match with address B.788312. Address B.788312 is marked as processed but is not added to the list of addresses to be advertised by LGN 626a.

The next item in the summary address list for LGN 625a is summary address B.458. Comparing B.458 with the remaining six reachable addresses for LGN 625a yields a match with reachable address B.458225 (recall that reachable address B.458032 already matched exception summary address B.4580 and has therefore already been processed and removed from the unprocessed reachable addresses). There is only one match, so address B.458 together with the reachable address information for address B.458225 (incl. its scope of 0) is added to the list of addresses to be advertised by LGN 625a.

The second-to-last item in LGN 625a's summary address list is summary address B.432. Comparing B.432 with the five remaining reachable addresses for LGN 625a yields a match with addresses B.4321 and B.4322. Reachable address information for these two addresses is therefore aggregated, and address B.432 together with the aggregated reachable address information is added to the list of addresses to be advertised by LGN 625a.

The last item in LGN 625a's summary address list is summary address A.111. Comparing A.111 with the three remaining reachable addresses for LGN 625a yields a match with all three remaining addresses A.1111, A.1112, and A.1113. The reachable address information for these three addresses is aggregated, and address A.111 together with the aggregated reachable address information for addresses A.1111, A.1112 and A.1113 is added to the list of addresses to be advertised by LGN 625a. The resulting addresses advertised by LGN 625a are:

A.111

B.432

B.458 (Scope 0)

B.458032 (Scope 8)

The second LGN in peer group 620 in the example of FIG. 6 is LGN 625b. LGN 625b has only one item in its summary address list, namely summary address A.112. LGN 625b is shown with only one reachable address, namely exterior address B.458032 with a scope of 8, which does not match LGN 625b's sole summary address A.112. Because exterior reachable address B.458032 does not match any item in LGN 625b's summary address list, it constitutes a foreign address and is added to the list of addresses to be advertised by LGN 625b, together with its reachable address information. The resulting sole address advertised by LGN 625b is:

B.458032 (Scope 8)

The advertisements made by nodes 625a-b within peer group 620 are summarized in Table 8 below.

TABLE 8

Addresses Advertised in Peer Group 620 of FIG. 7

| Node 625a | Node 625b |
|---|---|
| A.111 | B.458032 (Scope 8) |
| B.432 | |
| B.458 (Scope 0) | |
| B.458032 (Scope 8) | |

The addresses in Table 8 are all of the advertised reachable addresses for peer group 620. These addresses represent the reachable addresses to be considered for advertisement by LGN 635, which represents peer group 620 in next level peer group 630. Of those reachable addresses, the address B.458032 shows up twice: once from LGN 625a with a scope of 8 and once from node LGN 625b with a scope of 8. Because peer group 630 is at level 4, only addresses with a scope of 4 or lower are advertisable. Accordingly, address B.458032 from both nodes 625a and 625b is not an advertisable reachable address for LGN 635. The remaining advertisable reachable addresses for LGN 635 are:

A.111

B.432

B.458 (Scope 0)

LGN 635 has only summary address A.11 in its summary address list. Summary address A.11 matches one of LGN 635's reachable addresses, namely A.111. A.11 is therefore added to the list of addresses to be advertised by LGN 635. The remaining two reachable addresses do not match any item in LGN 635's summary address list. Accordingly, they are each also added to the list of addresses to be advertised by LGN 635. The resulting addresses advertised by LGN 635 in peer group 630 are thus:

A.11

B.432

B.458 (Scope 0)

The example of FIG. 6 shows how the exception summary address of the invention may be used together with conventional PNNI summary addresses to allow lower level advertisements matching the exception summary address that would otherwise be subject to summarization to be propagated upwards in their entirety, thereby preserving the propagation of their reachable address information (such as summary address, bandwidth, and scope). The exception summary address of the invention allows a network manager to preserve information for particular reachable addresses when such information is of particular interest for routing decisions, while still preserving the bandwidth saving features of conventional address summarization.

Thus, a method for advertising reachable address information in a network has been presented. Although the invention has been described using certain specific examples, it will be apparent to those skilled in the art that the invention is not limited to these few examples. For example, although the invention has been described with respect to PNNI networks, the invention is applicable, with substitution of terminology, as appropriate, to other networks as well. Other embodiments utilizing the inventive features of the invention will be apparent to those skilled in the art.

What is claimed is:

1. A method for advertising reachable address information in a network comprising the steps of:

providing a first summary address item specifying a first summary address prefix;

propagating unsummarized reachable address information for a reachable exception address matching said first summary address prefix; and propagating said first summary address item.

2. The method of claim 1 wherein said network comprises a PNNI network.

3. The method of claim 1 wherein said network comprises an IP network.

4. The method of claim 1 wherein said first summary address item comprises an exception summary address.

5. The method of claim 4 wherein said reachable address information comprises reachable addresses and associated parameters.

6. The method of claim 5 wherein said parameters comprise a scope parameter.

7. The method of claim 5 wherein said parameters comprise an administrative weight parameter.

8. The method of claim 5 wherein said parameters comprise a bandwidth parameter.

9. A method for advertising reachable address information in a network comprising the steps of:

providing a plurality of summary address items each specifying a summary address prefix;

determining reachable addresses matching said summary address prefixes according to a priority;

propagating reachable address information for reachable addresses matching a summary address prefix having a first priority;

summarizing reachable address information for reachable addresses matching a summary address prefix having a second priority but not said summary address prefix having said first priority.

10. The method of claim 9 wherein said network comprises a PNNI network.

11. The method of claim 9 wherein said summary address prefix having said first priority has a longer prefix than said summary address prefix having said second priority.

12. The method of claim 9 wherein said summary address prefix having said first priority comprises an exception summary address prefix.

13. The method of claim 9 wherein said network comprises an IP network.

14. The method of claim 9 wherein said reachable address information comprises reachable addresses and associated parameters.

15. The method of claim 14 wherein said parameters comprise a scope parameter.

16. The method of claim 14 wherein said parameters comprise an administrative weight parameter.

17. The method of claim 14 wherein said parameters comprise a bandwidth parameter.

18. A method for advertising reachable address information in a network comprising the steps of:
- configuring a first node of a first peer group with a first summary address item, said first summary address item comprising an exception summary address item;
- advertising reachable address information for a first plurality of reachable addresses matching said exception summary address item to members of said first peer group;
- configuring said first node of said first peer group with a second summary address item, said second summary address item comprising a summarizing summary address item;
- summarizing reachable address information for a second plurality of reachable addresses matching said summarizing summary address item but not matching said exception summary address item;
- advertising said summarized reachable address information to members of said first peer group.

19. The method of claim 18 wherein said network comprises a PNNI network.

20. The method of claim 19 wherein said network comprises an IP network.

21. The method of claim 18 wherein said reachable address information comprises reachable addresses and associated parameters.

22. The method of claim 21 wherein said parameters comprise a scope parameter.

23. The method of claim 21 wherein said parameters comprise an administrative weight parameter.

24. The method of claim 21 wherein said parameters comprise a bandwidth parameter.

* * * * *